Patented Nov. 10, 1931

1,831,274

UNITED STATES PATENT OFFICE

CHARLES S. WEBBER, OF SPRINGFIELD, MASSACHUSETTS, AND CYRIL J. STAUD, OF ROCHESTER, NEW YORK, ASSIGNORS TO EASTMAN KODAK COMPANY, OF ROCHESTER, NEW YORK, A CORPORATION OF NEW YORK

PROCESS FOR THE BENZOYLATION OF CELLULOSE

No Drawing.  Application filed December 14, 1929. Serial No. 414,205.

This invention relates to a process for the benzoylation of cellulose and particularly to the benzoylation of the cellulose in the presence of B B' dichlor diethyl ether.

Heretofore, cellulose benzoate has been prepared by either one of two methods. One method, which was disclosed by Dr. Alfred Wohl in his German Patent No. 139,669, effects the esterification of the cellulose by subjecting it to the action of benzoyl chloride and pyridine, in the presence of nitrobenzene as a solvent. This reaction is conducted at a temperature of about 130 to 150° C. Such a high temperature is necessary, due to the fact that the nitrobenzene does not act as a solvent for the cellulose benzoate at lower temperatures. This requirement of high temperature treatment, as would be expected, degrades the cellulose and, as a result, the cellulose benzoate produced. Another method for effecting this esterification of cellulose is conducted by first mercerizing the cellulose or by preparing the so-called soda-cellulose and then benzoylating this material in a bath containing benzoyl chloride heated to a high temperature. The same disadvantages which are obtained in the Wohl process are likewise present in this process.

An object of the present invention is to provide a process for the benzoylation of cellulose at relatively low temperatures in the presence of a liquid which acts as a solvent of the cellulose benzoate. Another object of this invention is to prepare a substantially undegraded cellulose benzoate by conducting the reaction in the presence of a suitable solvent thereof. Other objects will hereinafter appear.

We have found that cellulose can be benzoylated at a relatively low temperature by treating it in a bath containing pyridine and benzoyl chloride, together with B B' dichlor diethyl ether. The B B' dichlor diethyl ether unexpectedly acts as a solvent for the cellulose benzoate at all reaction temperatures which would ordinarily be employed. It is, therefore, not necessary to carry the temperature of the reaction much above 100° C., and as a result substantially no degradation of the cellulose and the resulting cellulose benzoate results.

Not only does B B' dichlor diethyl ether act as a solvent for effecting this reaction at relatively low temperatures, but it likewise may be used to replace even as much as one-half of the pyridine required in the reaction. Owing to the fact that B B' dichlor diethyl ether, although a comparatively new commercial solvent, can be produced at a low cost, its substitution for pyridine in the reaction considerably decreases the cost of production of cellulose benzoate. Moreover, the B B' dichlor diethyl ether may be used to replace part of the benzoyl chloride required by the ordinary benzoylating process. For example, by the process of Wohl, the benzoylation requires six times as much benzoyl chloride as the cellulose present, while in our process, due to the presence of B B' dichlor diethyl ether, this ratio may be reduced even as low as 2½ parts of benzoyl chloride to 1 part of cotton or cellulose, a saving of well over 50% in the benzoyl chloride required. The proportion of pyridine required to the cotton may likewise be decreased to almost the same percentage.

Formerly, due to the excessive temperatures required, it was necessary to conduct this reaction at greater than atmospheric pressure in order that the boiling point of the constituents might be sufficiently increased to effect the required temperature for the solution of the products. In our process, on the other hand, the reaction may be readily conducted at atmospheric pressure, at or about the boiling point of the reaction mixture. In order that the more volatile constituents are not lost in this treatment, we have found it advantageous to effect the reaction in a flask or other container to which a vertical or reflux condenser has been affixed. Furthermore, the advantages afforded by using B B' dichlor diethyl ether as a solvent enables one to conduct this reaction at a temperature below the boiling point of this solvent, thereby producing a cellulose benzoate having practically no degradation. It is, of course, understood that a lowering of the temperature of the reaction likewise increases the time for effecting the reaction. At a temperature in the neighborhood of 100° C., however, a fully acylated cellulose tribenzoate may be prepared in a period of from 19 to 24 hours.

We shall now give an example of a preferred method of conducting our process, but it will be understood that we are not limited by the details therein given except as they may be so restricted in the appended claims. To 10 parts of cotton linters or other fairly well purified cellulosic material there are added 100 parts of B B' dichlor diethyl ether, 30 parts of benzoyl chloride, and 20 parts of pyridine. This magma is placed in a suitable container under a reflux condenser or similar condensing means open to the atmosphere and the container subjected to the temperature of a steam bath. After heating for a period of about 19 to 24 hours, a cellulose tribenzoate will be produced. The product forms a gelatinous dope which may be readily precipitated in alcohol, alcohol-ether or other non-solvent of the cellulose tribenzoate. The product is soluble in ethylene chloride, chloroform, ethylene chloride-alcohol, chloroform-alcohol and benzene-alcohol.

In carrying out this invention, it will be understood that the proportions herein given may be varied through fairly wide limits, providing B B' dichlor diethyl ether be present in sufficient amounts to effect solution of the cellulose tribenzoate produced and the temperature of the reaction mixture be maintained well below the point where it produces drastic degradation of the cellulose without departing from this invention or sacrificing any of the advantages that may be derived therefrom.

What we claim as our invention and desire to be secured by Letters Patent of the United States is:

1. A process for the manufacture of cellulose benzoate which comprises benzoylating the cellulose in the presence of pyridine and benzoyl chloride insufficient conjointly to effect the solution of the benzoylated product, and a solvent for the cellulose benzoate product which acts as such at a temperature of approximately 100° C., the solvent coacting with the pyridine and benzoyl chloride to effect the solution of the cellulose benzoate formed.

2. A process for the manufacture of cellulose benzoate which comprises benzoylating the cellulose in the presence of B B' dichlor diethyl ether.

3. A process for the manufacture of cellulose benzoate which comprises treating the cellulose in the presence of benzoyl chloride, pyridine and B B' dichlor diethyl ether.

4. A process for the manufacture of cellulose benzoate which comprises treating the cellulose in the presence of benzoyl chloride, pyridine and B B' dichlor diethyl ether, the benzoylation being effected while refluxing the more volatile constituents of the benzoylation bath.

5. A process for the manufacture of cellulose benzoate which comprises esterifying 10 parts of cellulose by acting thereon with an esterifying bath containing approximately 100 parts of B B' dichlor diethyl ether, 30 parts of benzoyl chloride and 20 parts of pyridine.

Signed at Springfield, Mass., this 3rd day of December, 1929.

CHARLES S. WEBBER.
CYRIL J. STAUD.